United States Patent [19]
Murphy

[11] Patent Number: 6,068,307
[45] Date of Patent: *May 30, 2000

[54] CLOSURE SYSTEM FOR DEVICES HAVING A STYLUS

[75] Inventor: Stephen C. Murphy, Payette, Id.

[73] Assignee: Micron Electronics, Inc., Nampa, Id.

[*] Notice: This patent is subject to a terminal disclaimer.

[21] Appl. No.: 09/296,457

[22] Filed: Apr. 21, 1999

Related U.S. Application Data

[63] Continuation-in-part of application No. 09/098,173, Jun. 16, 1998.

[51] Int. Cl.[7] .................................................. E05C 19/00
[52] U.S. Cl. .......................................... 292/302; 292/300
[58] Field of Search .................................. 292/300, 302, 292/175, 228, 220, 145, 146, 202, 332, 335

[56] References Cited

U.S. PATENT DOCUMENTS

| | | |
|---|---|---|
| 1,659,822 | 2/1928 | Innes . |
| 2,194,763 | 3/1940 | Mayer . |
| 2,210,229 | 8/1940 | Boemer . |
| 3,933,381 | 1/1976 | Schurman . |
| 4,153,178 | 5/1979 | Weavers . |
| 4,844,519 | 7/1989 | Dagon . |
| 4,927,986 | 5/1990 | Daly . |
| 4,943,096 | 7/1990 | Looper . |
| 5,067,573 | 11/1991 | Uchida . |
| 5,200,913 | 4/1993 | Hawkins et al. . |
| 5,401,917 | 3/1995 | Yoshida et al. . |
| 5,422,442 | 6/1995 | Gouda et al. . |
| 5,465,191 | 11/1995 | Nomura et al. . |
| 5,483,262 | 1/1996 | Izutani . |
| 5,576,502 | 11/1996 | Fukushima et al. . |
| 5,576,929 | 11/1996 | Uchiyama et al. . |
| 5,622,395 | 4/1997 | Shine et al. . |
| 5,758,941 | 6/1998 | Snell . |

*Primary Examiner*—Teri Pham
*Attorney, Agent, or Firm*—Knobbe, Martens, Olson, Bear, LLP

[57] ABSTRACT

A closure system useful for securing a device having a stylus. In a first embodiment, the closure system includes a housing having first and second housing members, the first housing member being configured to matingly contact the second housing member when the device is in a closed configuration. The stylus is received within a channel located in the second housing member. A latch release also located within the second member is controlled by the position of the stylus such that when the stylus is inserted within the channel, the latch release engages a latch located on the first member, thereby preventing the first and second members from separating. The latch release may also be used to block the latch such that the first and second housing members can not be mated when the stylus is removed from the channel. In another embodiment, a blocking device located within the second housing member and separate from the latch is utilized to prevent the device from being closed when the stylus is removed. A method of securing the aforementioned housing is also disclosed.

15 Claims, 12 Drawing Sheets

CLOSURE SYSTEM FOR DEVICES HAVING A STYLUS

RELATED APPLICATIONS

This application is a continuation-in part under 35 U.S.C. § 120 to a co-pending, commonly-owned U.S. patent application entitled, "Closure System for Devices Having a Stylus," U.S. application Ser. No. 09/098,173, filed on Jun. 16, 1998.

BACKGROUND OF THE INVENTION

1. Field of the Invention

The invention relates to computers and, more particularly, to a method and system for preventing the latching of a housing of a computer if a stylus of the computer is not secured within a receiver of the computer so as to prevent the loss of the stylus.

2. Description of the Related Technology

Many types of electronic devices such as calculators, personal planners, portable, handheld, or "palm-top," computers, for example, which are manufactured today, often use a stylus, otherwise known as a touch pen, in conjunction with a touch sensitive screen, to implement computer operations. For convenience, such devices will be referred to generically herein as "computers." With these computers, a user may select icons displayed on the touch-sensitive screen, for example, by touching the screen at appropriate locations with the stylus. The stylus is typically contained and held within a sleeve, channel, or other type of receiver, which is typically located within the housing of the computer. After a user has finished using the stylus, he or she can then insert the stylus into the sleeve for safekeeping and turn the computer off.

Unfortunately, as human beings sometimes tend to be forgetful, or become preoccupied or distracted during use of a computer, the stylus of prior art computers often becomes lost, or misplaced. Therefore, what is needed is a method and system for preventing the loss of a stylus of an electronic device such as a computer.

SUMMARY OF THE INVENTION

The invention addresses the above and other needs by providing a method and system for preventing a computer from latching closed properly when a stylus of the computer is not seated properly in its holder.

In one embodiment, a closure system for a device having a stylus includes: a housing having a first member and a second member, wherein the first member is configured to matingly contact the second member in a closed configuration; a stylus receiver located in the second member, the stylus receiver receiving the stylus therein; a latch coupled to the first member; and a latch release coupled to the second member, the latch release engaging and interlocking with the latch when the first and second members are in the closed configuration and when the stylus is positioned within the stylus receiver.

In another embodiment, a closure system for a device having a stylus includes: housing means having a first member and a second member, wherein the first member is configured to matingly contact the second member in a closed configuration; means for receiving and holding the stylus therein; and means for latching the first and second members of the housing means in the closed configuration when the stylus is positioned within the stylus receiver.

In a further embodiment, a method of securing a housing of a device having a stylus in a closed configuration includes: inserting the stylus into a stylus receiver within a first member of the housing; bringing the first member of the housing into mating contact with a second member of the housing so as to place the housing in the closed configuration; and latching the first member shut with respect to the second member only when the stylus is positioned within the stylus receiver. means.

DETAILED DESCRIPTION OF THE INVENTION

The invention is described in detail below with reference to the figures, wherein like elements are referenced with like numerals throughout. It will be recognized that while the following description is cast in terms of a portable computer, the system and method of the invention may be used with other types of devices having a housing requiring closure.

Figure 1:
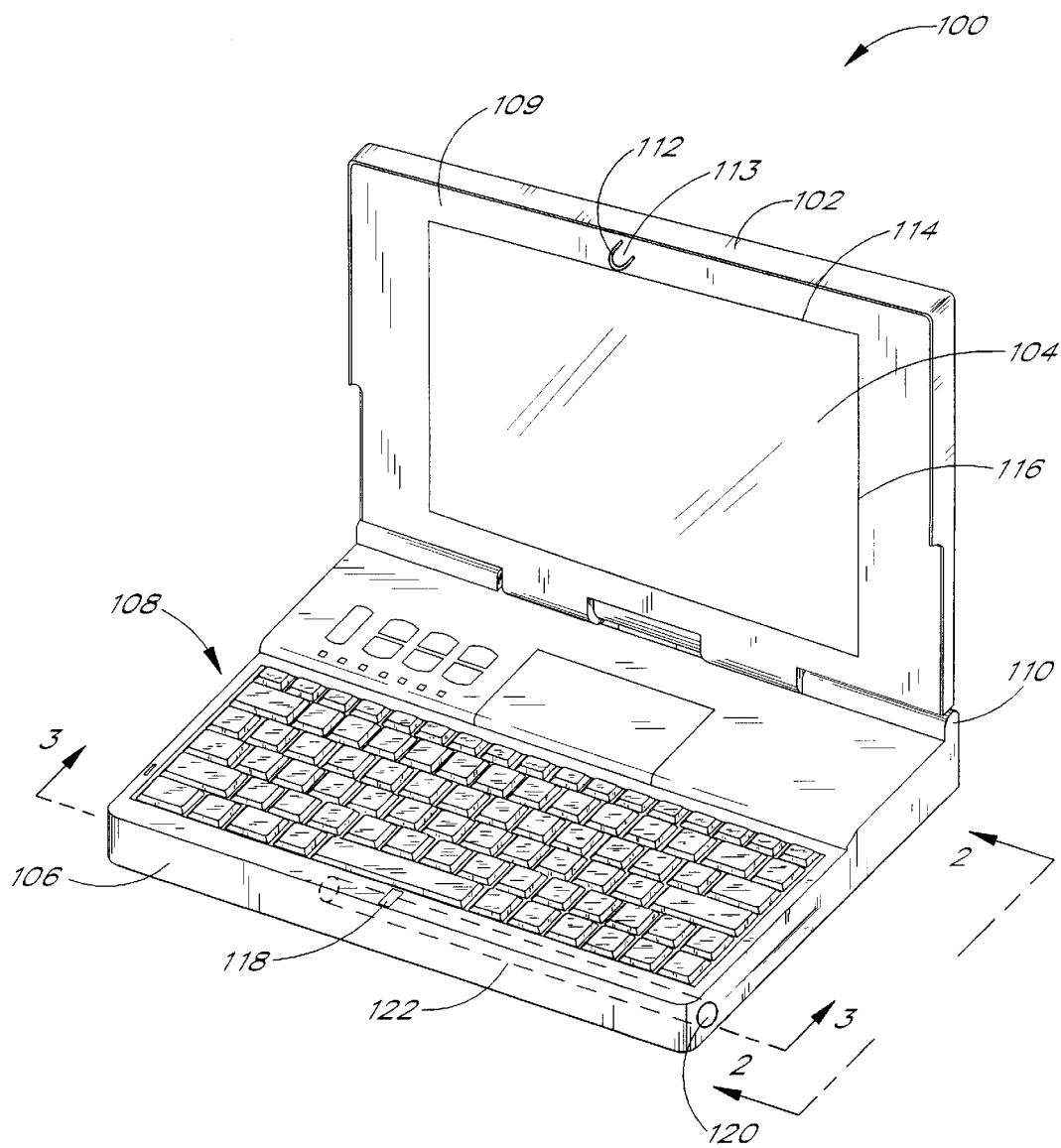
FIG. 1 is a perspective view of a computer having a stylus, a channel for receiving the stylus therein, and a touch-sensitive screen, in accordance with one embodiment of the invention.

Referring to FIG. 1, a perspective view of a computer 100, designed in accordance with one embodiment of the invention, is illustrated. The computer 100 includes a first member or top 102 which provides a display screen 104 for displaying text, images, and graphical user interface (GUI) data to the operator of the computer 100. The computer 100 further includes a second member or base 106 that provides an alphanumeric keyboard 108 for receiving input from an operator of the computer 100. The first member 102 is coupled to the second member 106 by a hinge 110 that allows the first member 102 to swing away from the second member 106 when the computer is "opened" for use by an operator, and allows the first member 102 to swing toward the second member 106 so as to "close" the computer 100 when it is shut off and not being used by an operator. In one embodiment, the hinge 110 is spring-biased such that the first member 102 automatically swings away from the second member 106 when the first member 102 is not properly latched shut to the second member 106.

To latch the first member 102 shut with respect to the second member 106, the computer 100 includes a latch 112 attached to the first member 102 so as to extend outwardly from a front surface 109 of the first member 102 on which the display screen 104 is provided. As shown in FIG. 1, the latch 112 is located above a top edge 114 of the display screen 104 at a substantially central position between the two side edges 116 of the display screen 104. When the first member 102 is in a closed position with respect to the second member 106, the latch 112 passes through a latch aperture 118, which is located on the second member 106 so as to matingly receive the latch 112 therethrough. As will be described in further detail below with respect to FIG. 3, in this closed position, a stylus 120 which is received within a stylus channel, or receiver, 122, passes through a hole 113 of the latch 112 so as to prevent the first member 102 from swinging away from the second member 106, thereby latching the computer 100 in a closed position. Although the latch 112 is illustrated as an eyelet surrounding the hole 113, the latch 112 may also be configured in other shapes, such as that of a hook, for example.

Figure 2A:
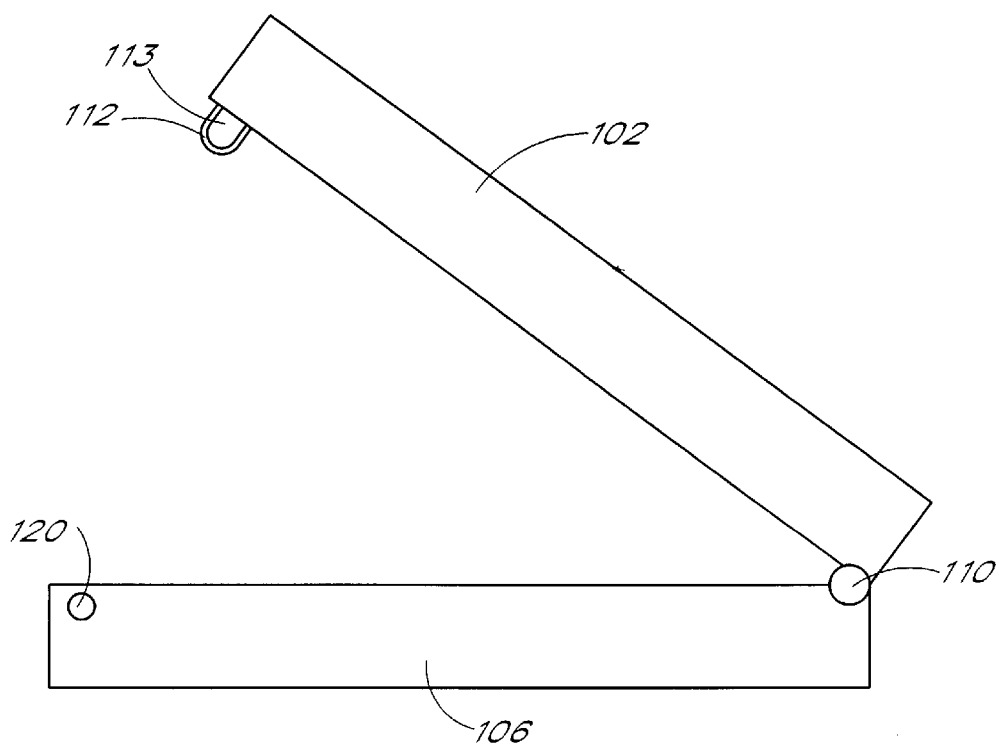
FIG. 2A is an elevational side-view of a computer, taken along lines 2—2 of FIG. 1, when the computer is in an open position.

FIG. 2A is an elevational side view of the computer 100 of FIG. 1, taken along line 2—2 of FIG. 1, when the computer 100 is in the open position. In this position, the first member 102 is rotated away from the second member 106. The first and second members 102 and 106, respectively, rotate about the hinge 110. As shown in FIG. 2A, an end portion of a stylus 120, which is received within a stylus channel 122 (FIG. 1) of the computer 100, extends outwardly from a side surface of the second member 106.

Figure 2B:
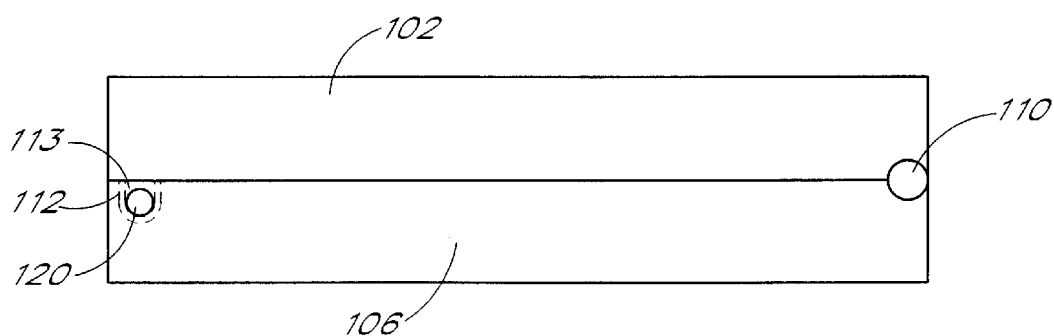
FIG. 2B is an elevational side-view of a computer, taken along line 2—2 of FIG. 1, when the computer is in a closed position.

FIG. 2B is an elevational side view of the computer 100 of FIG. 1, taken along line 2—2 in FIG. 1, when the computer 100 is in the closed position. In this position, the first member 102 is rotated about the hinge 110 toward the second member 106 such that the first member 102 and the second member 106 come together to enclose the computer 100. When the computer is in this closed position, the latch 112 passes through the latch aperture 118 and transversely extends across the stylus channel 122 such that the hole 113 of the latch 112 is horizontally aligned with the stylus channel 122. After the computer 100 is in the closed position, the stylus 120 may be inserted into the stylus channel 122. As the stylus 120 is being inserted into the stylus channel 122, it passes through the hole 113 of the latch 112, thereby acting as a bolt or pin which secures the latch 112 against retracting outwardly from the latch aperture 118. Since the first member 102 is attached to the latch 112, the first member 102 is prevented from swinging away from the second member 106. In this way, the computer 100 is latched closed.

Figure 3:
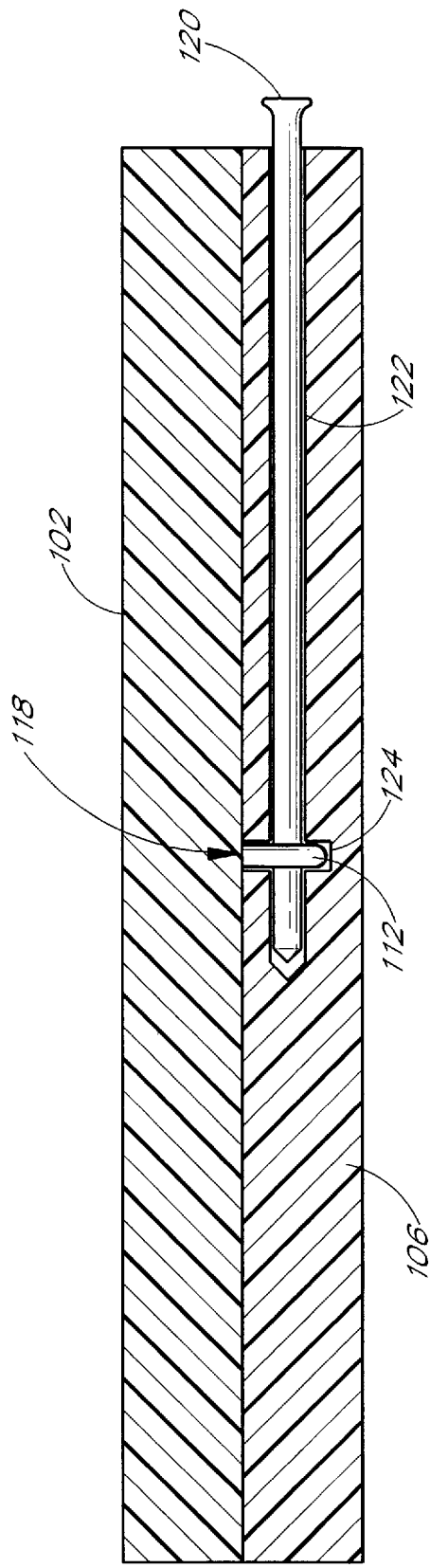
FIG. 3 is a cross-sectional view of the computer of FIG. 1, taken along line 3—3 of FIG. 1 at approximately a longitudinal bisection of the stylus channel of the computer.

Referring to FIG. 3, when the computer 100 is in the closed position, the latch 112 passes through the latch aperture 118 and transversely extends across the stylus channel 122. The latch 112 is seated within a recess 124 located within the second member 106 and which extends downwardly from a bottom perimeter of the channel 122, such that the hole 113 (FIGS. 2A and 2B) of the latch 112 is aligned with the longitudinal axis of the stylus channel 122. The recess 124 is configured to provide clearance for the latch so as to allow a peripheral portion of the latch 112 to extend beyond the cylindrical boundaries of the stylus channel 122, thereby allowing the hole 113 of the latch 112 to be aligned with the longitudinal axis of the channel 122 such that when the stylus 120 is inserted into the channel 122, it passes through the hole 113 of the latch 112.

Note that because the first member is biased in the open position, the computer will not stay closed without insertion of the stylus. This reminds the user to insert the stylus 120 into the stylus channel 122 after each use of the computer 100. By requiring the stylus 120 to be inserted into the stylus channel 122 to secure the computer 100 in a closed position, the likelihood that a user of the computer 100 will inadvertently lose the stylus, or leave it behind after he or she has finished using it, is significantly reduced. The user is reminded after every session with the computer 100 to place the stylus 120 into the stylus channel 122. Otherwise, the first member 102 will not be able to be secured shut with respect to the second member 106. In this way, the method and system of the invention provides a safeguard against losing the stylus 120.

As shown in FIG. 3, the stylus channel 122 extends within the body of the second member 106 at a location behind a front surface of the second member 106 and in an orientation that is parallel to that front surface. However, the channel 122 need not be located and oriented in this position. Depending on the size and shape of the computer 100, the stylus channel 122 may be located on the first member 102, for example, or run in a direction perpendicular to the plane of the sheet of paper upon which FIG. 3 is printed. The location, and orientation, of the stylus channel 122, and a corresponding position of the latch 112, may be implemented in any desired configuration allowed by the size, shape and space available within the computer 100.

Figure 4:
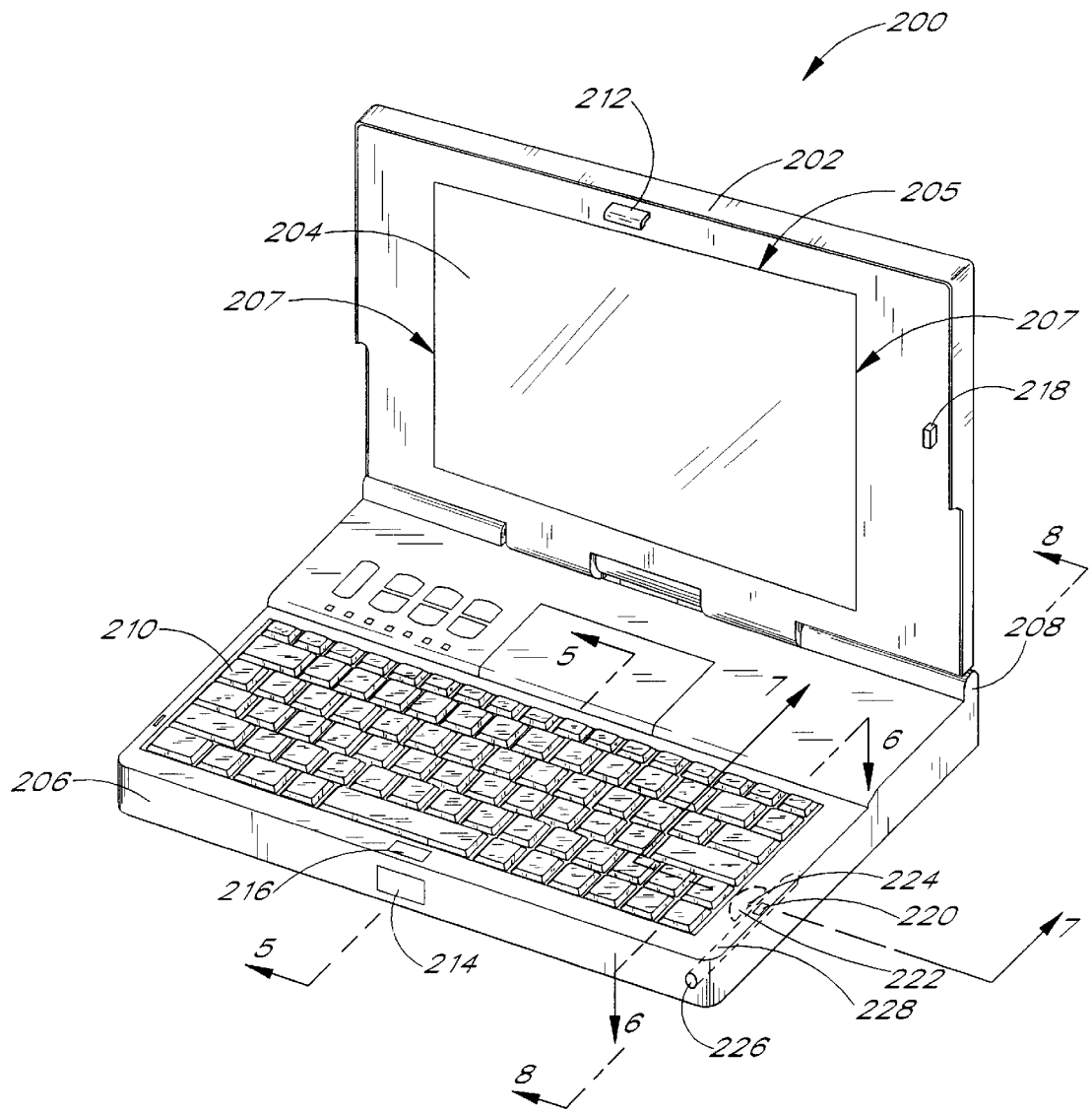
FIG. 4 is a perspective view of a computer having a stylus, a channel for receiving the stylus therein, and a touch-sensitive screen, in accordance with another embodiment of the invention.

FIG. 4 is a perspective view of a computer 200, in accordance with another embodiment of the invention. The computer 200 includes a first member 202 which provides a display screen 204 for displaying text and other types of graphical information/images, and second member 206 which is rotatably coupled to the second member 206 by a hinge 208. The second member 206 provides an alphanumeric keyboard 210 for receiving user inputs.

To latch the first member 202 shut with respect to the second member 206, the computer 200 includes a latch 212, attached to the first member 202 so as to extend outwardly from a front surface of the first member 202 on which the display screen 204 is provided. As shown in FIG. 4 the latch 212 is located above a top edge 205 of the display screen at a substantially central position between the two side edges 207 of the display screen 204. When the first member 202 is in a closed position with respect to the second member 206, the latch 212 passes through a latch aperture 216, which is provided on the second member 206 at a position which is in mating alignment with the latch 212 when the first member 202 is in the closed position with respect to the second member 206. As will be described in further detail below with respect to FIG. 5, in this closed position, the latch 212 interlocks with the latch release 214 to secure the computer 200 in a closed position.

The computer 200 further includes a stop member 218 attached to the front surface of the first member 202 and extending outwardly therefrom. In one embodiment the stop member 218 is configured in the shape of a peg which extends outwardly from the front surface of the first member 202 as shown in FIG. 4. When the computer 200 is in the closed position, the stop member 218 is inserted into an aperture 220 which is configured to receive the stop member 218. A blocking member 222, configured in the shape of a half circular disk, is located within the housing of the second member 206 at a location adjacent to the aperture 220. The blocking member 222 rotates about a pin 224 which serves as an axis of rotation for the blocking member 222. The pin 224 is attached at one end to an internal wall of the second member and is spring biased to cause the blocking member 222 to swing clockwise in order to obstruct the aperture 224 when a stylus 226 is not positioned within a stylus channel 228 located in the second member 206. The structure and operation of the blocking member 222 is discussed in greater detail below with respect to FIGS. 6A, 6B, and 7.

In FIG. 4, the stylus 226 is shown positioned within the stylus channel 228 and pushes the peg stop. Upon inserting the stylus 226 into the stylus channel 228, the stylus 226 contacts and pushes a portion of the blocking member 222 so as to rotate it counter-clockwise away from the aperture 220. Therefore, when the stylus 226 is in the stylus channel 228, the aperture 220 is not obstructed by the blocking member 222. As explained in further detail below with respect to FIGS. 5, 6A and 6B, in order to latch the computer 200 closed, the aperture 220 must not be obstructed by the blocking member 222.

Figure 5:
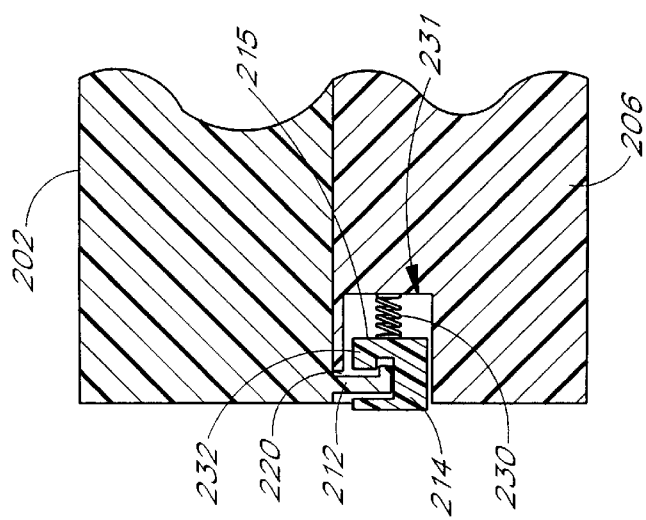
FIG. 5 is an elevational, cross-sectional view of the computer of FIG. 4, taken along line 5—5 of FIG. 4.

Referring to FIG. 5, a cross-sectional view of the computer 200 of FIG. 4, taken along line 5—5 of FIG. 4, when the computer 200 is in a closed position is illustrated. In this closed position, the latch 212 extends through the latch aperture 216 and engages the latch release 214 which is configured to receive and hold the latch 212. The latch release 214 is spring biased by a spring 230 which is positioned between a rear wall 215 of the latch release 214 and an internal support wall 231 of the second member 206. The spring 230 biases the latch release 214 outwardly, to the left as shown in FIG. 5. Therefore, a hook portion 232 of the latch release interlocks with the latch 212, thereby preventing the latch 212 from moving out of the latch aperture 220.

In the embodiment of FIG. 4, the first member 202 is spring-biased by means of the hinge 208 to move away from the second member 206 when the latch 212 is not interlocked with the latch release 214. The latch 212 may be released from the latch release 214 by pressing the latch release 214 inwardly, toward the right as shown in FIG. 5. This compresses the spring 230 and disengages the hook portion 232 of the latch release 214 from the latch 212. When the latch 212 is released, the first member 202 automatically swings upwardly and away from the second member 206 because of the spring-biased hinge 208.

Figure 6B:
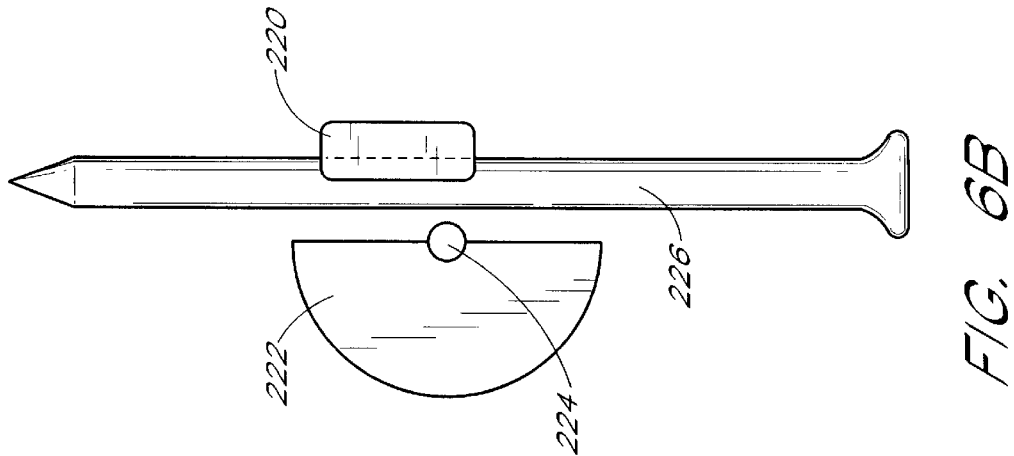
FIG. 6B is a top plan view of the aperture and blocking member of FIG. 6A, as configured when a stylus is inserted into the stylus channel of the computer.
Figure 6A:
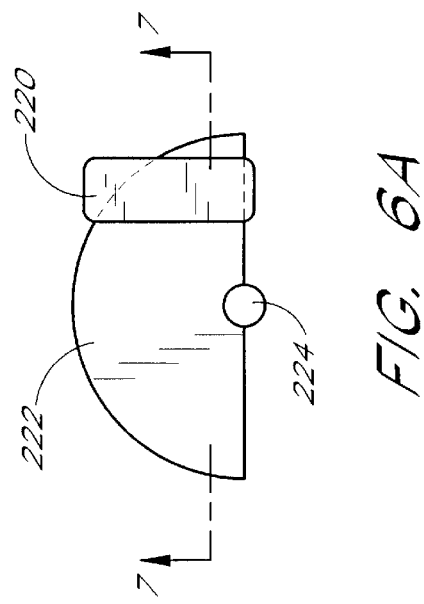
FIG. 6A is a top plan view of an aperture and blocking member of the computer of FIG. 4 as configured when a stylus is not present within a stylus channel of the computer.

Referring to FIG. 6A, a top view of the blocking member 222 and the aperture 220, when the stylus 226 is not received within the stylus channel 228, is illustrated. When the stylus 226 is not inserted into the stylus channel 228, the blocking member 222 is biased to rotate so that it is positioned to obstruct the aperture 220 so as to prevent the stop member 218 (FIG. 4) from passing through the aperture 220. When a user attempts to close the computer in this state, he or she will find that the stop member 218 comes into contact with the blocking member 222 before the first member 202 can be fully closed with respect to the second member 206. Since the first member 202 can not be fully closed with respect to the second member 206, the latch 212, attached to the first member 202, will not be able to engage the latch release 214. If the first member 202 is spring biased to rotate away from the second member 206 by means of a spring-biased hinge 208, as described above, the first member 202 will automatically swing open, away from the second member 206.

Referring to FIG. 6B, the same view as shown in FIG. 6A is illustrated, except a stylus 226 is positioned within the stylus channel 228 (FIG. 4). The blocking member 222 is thereby rotated counter-clockwise about the pin 224 and no longer obstructs the aperture 220. Although the stylus 226 is located beneath the aperture 220, it is positioned far enough below the aperture 220 so as to provide adequate room for the stop member 218 to fully enter the aperture 220. Therefore, when the stylus 226 is inserted into the stylus channel 228, the first member 202 may be shut closed with respect to the second member 206. This allows the latch 212 to engage the latch release 214 so as to secure the computer 200 in a closed position.

Figure 7:
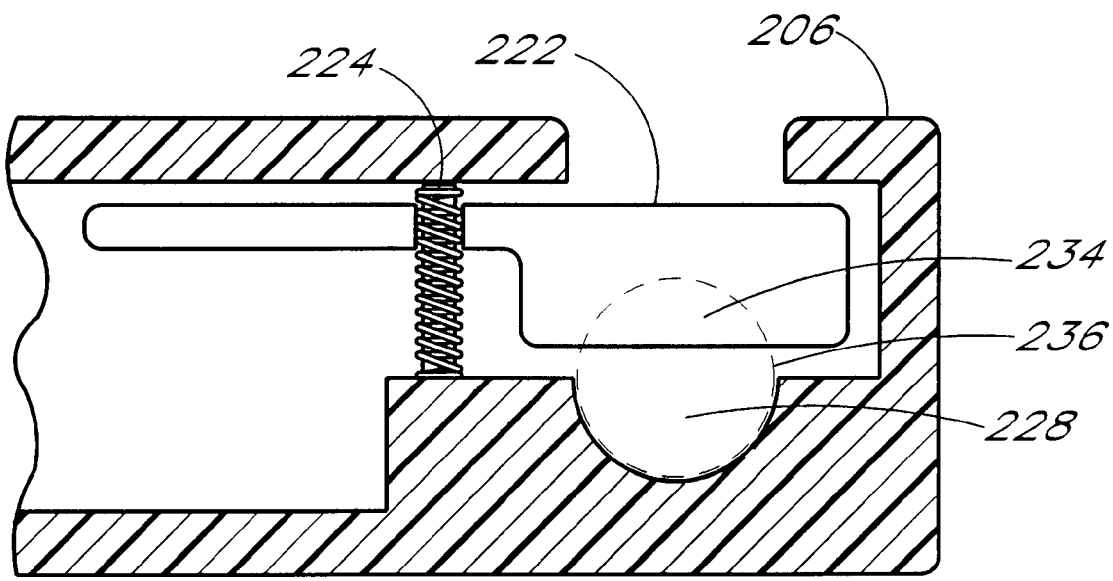
FIG. 7 is an elevational, cross-sectional view of the computer of FIG. 4, taken along line 7—7 of that figure at a cross-section adjacent the location of the blocking member in the computer.

FIG. 7 is an elevational cross-sectional view of a portion of the computer 200, taken along line 7—7 of FIG. 4. As shown in FIG. 7, the blocking member 222 includes a bottom portion 234 which engages the stylus 226 (FIG. 6B) when it is inserted into the stylus channel 228. A cylindrical boundary of the stylus channel 228 is represented by dashed lines 228 in FIG. 7. As the stylus 226 is inserted into the channel 228 it engages the bottom portion 234 of the blocking member 222, causing the blocking member 222 to rotate counter-clockwise about the axis pin 224. When the stylus 226 is fully inserted into the stylus channel 228, the blocking member 222 is rotated counter-clockwise by approximately ninety (90) degrees and no longer obstructs any portion of the aperture 220. When positioned within the stylus channel 228, the stylus 226 is located far enough below the opening of the aperture 220 such that there is ample room for the stop member 218 to be received through the aperture 220.

Figure 8:
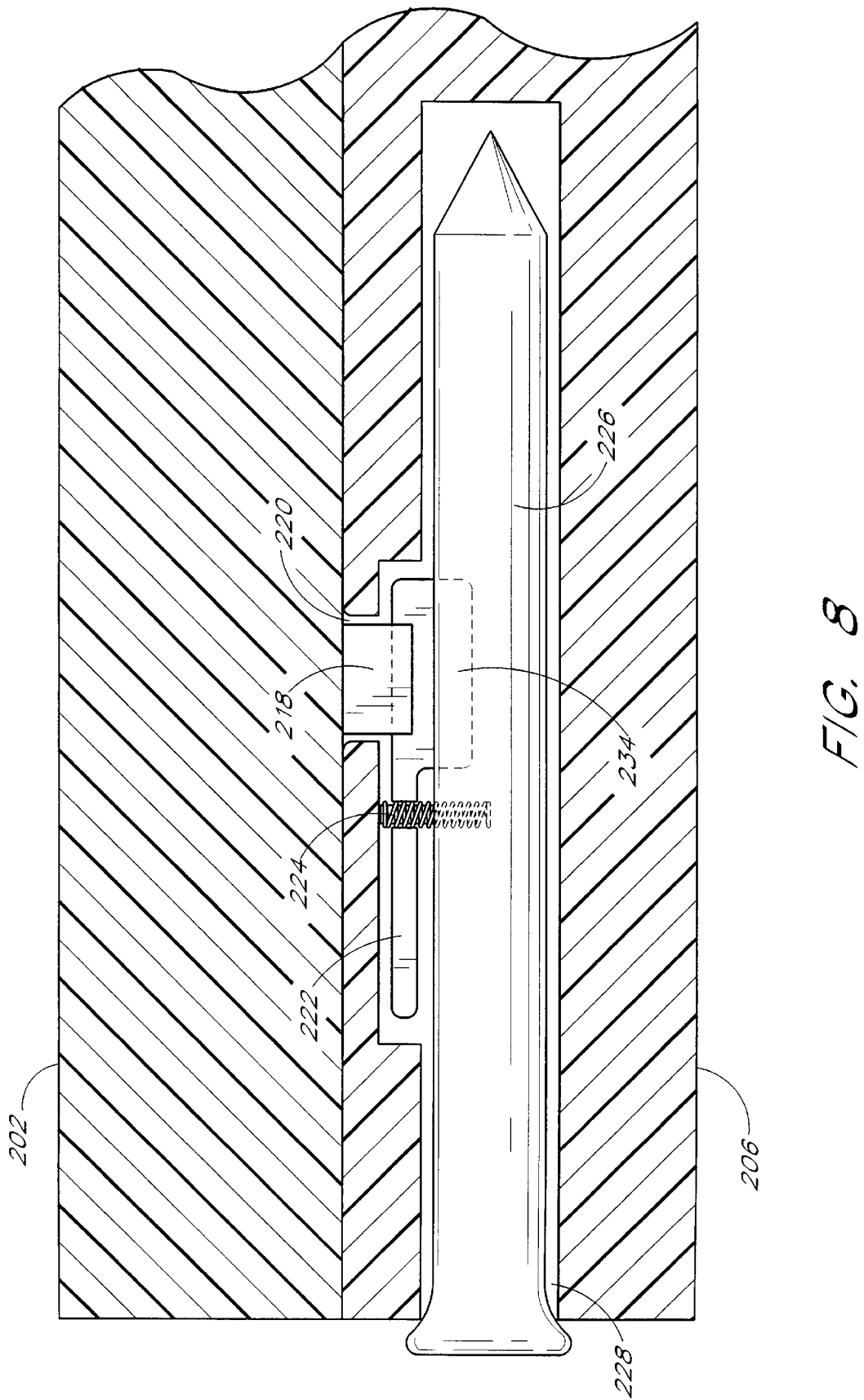
FIG. 8 is an elevational, cross-sectional view of the computer of FIG. 4, taken along line 8—8 of that figure, showing the position of the blocking member of the computer when the computer is in a closed position, and when the stylus is received within the stylus channel in accordance with one embodiment of the invention.

FIG. 8 is an elevational cross-sectional view of the computer 200, taken along line 8—8 of FIG. 4, when the computer 200 is in the closed position. In this closed position, the stylus 226 is positioned within the stylus channel 228 and engages a lower portion 234 of the blocking member 222 such that the blocking member 222 is rotated counter-clockwise approximately ninety (90) degrees about the axis pin 224. When the blocking member 222 is rotated, the aperture 220 is unobstructed and receives the stop member 218 therethrough, thereby allowing the first member 202 to close flush with respect to the second member 206.

Figure 9A:
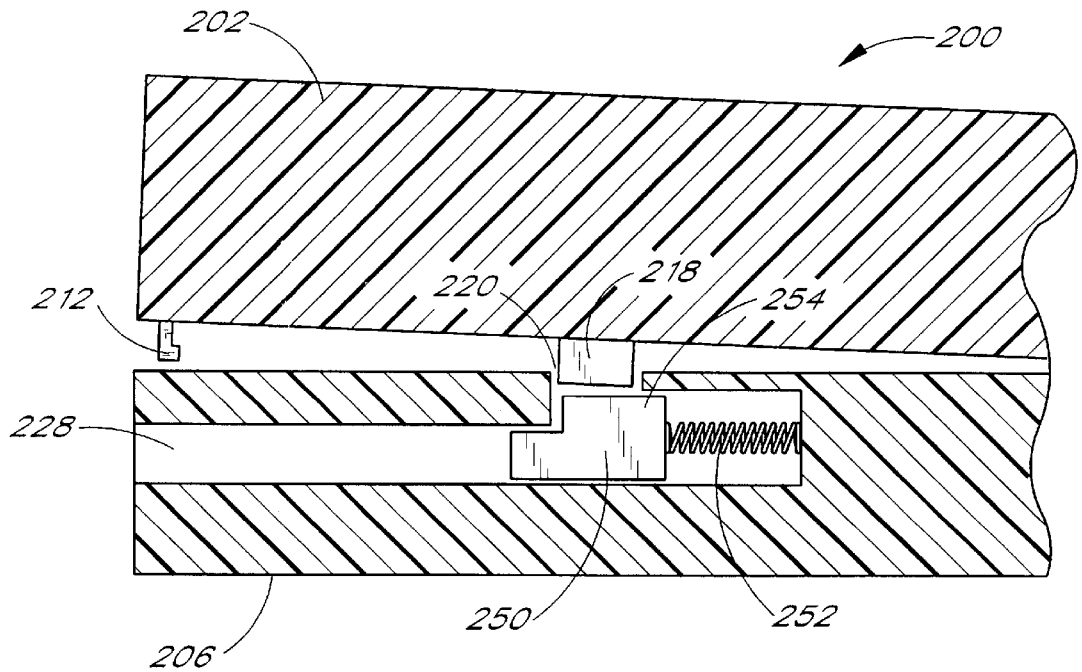
FIG. 9A is an elevational, cross-sectional view of the computer of FIG. 4 taken along line 8—8 of that figure, but illustrating another embodiment of a blocking member which is positioned adjacent an aperture so as to block a stop member from being received within the aperture.

Although the blocking member 222 has been described above as a spring-biased, half circular disk, the blocking member 222 may be configured in other ways so as to provide the function of obstructing the aperture 220 when the stylus 226 is not positioned within the stylus channel 228. For example, as shown in FIG. 9A, a blocking member 250 may be configured in the shape of an L-shaped block. When a stylus (not shown) is not positioned within the stylus channel 228, the blocking member 250 is biased toward the opening of the stylus channel 228 by a biasing spring 252 which pushes the blocking member 250 outwardly toward the opening of the stylus channel 228. In this position, a top portion 254 of the blocking member 250 is positioned beneath the aperture 220 so as to block the aperture 220. When a user attempts to close the first member 202 with respect to the second member 206, the stop member 218 is prevented from entering the aperture 220 by the top portion 254 of the blocking member 250. Therefore, the user will not be able to close the computer 200.

Figure 9B:
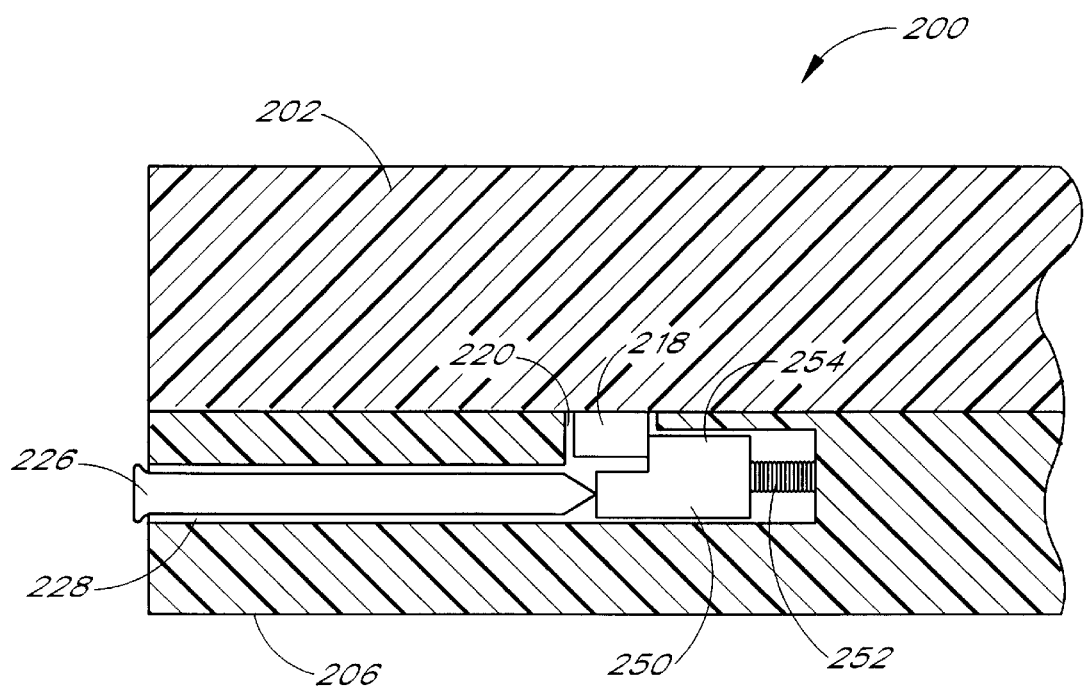
FIG. 9B is an elevational, cross-sectional view of the computer illustrated in FIG. 9A, showing the relative positions of the blocking member, the stop member and a stylus received within a stylus channel, when the computer is in a closed position.

Referring to FIG. 9B, when a stylus 226 is inserted into the stylus channel 228, the stylus 226 pushes the blocking member 250 inwardly, toward the right, and thereby latches the blocking member 250 in its retracted position. A latch mechanism for latching the blocking member 250 is described in further detail below. In this position, the top portion 254 of the blocking member 250 no longer obstructs the aperture 220 and the stop member 218 is allowed to pass through the aperture 220. As described above, the blocking member 250 is spring biased to push the stylus 226 outwardly to the left by biasing spring 252. However, as described in further detail below, the blocking member 250 can be configured to be latched when it is pushed inwardly by a certain distance so as to resist the outward tensile force generated by the biasing spring 252. To release the blocking member 250 from its retracted position, a user may press the end of the stylus 226 inwardly so as to unlatch the blocking member 250 from its retracted position. After the blocking member 250 is unlatched, the biasing spring 252 pushes the blocking member 250 and the stylus 226 outwardly. The stylus 226 may then be pulled out of the stylus channel 228 and used by the operator. The latch mechanism employed for latching the blocking member 250 in its retracted position, and releasing the blocking member 250 from the retracted position, may be any one of numerous mechanisms which are found in commercially available pens, for example.

As any one who has written with a pen can appreciate, by pressing a button located at one end of a pen, a writing tip may be caused to extend outwardly from the opposite end of the pen. A latch mechanism holds the writing tip of the pen against a tensile force produced by a biasing spring within the pen, thus allowing a user to write/draw using the writing tip of the pen. To release the pen tip from this outward position, the user need only press down on the button a second time, to disengage the latch mechanism which holds the pen tip outwardly, thereby retracting the writing tip into the body of the pen. The blocking member 250 may be spring-biased and configured with any well-known latch mechanism, such as that described above with respect to writing pens, for example, in accordance with one embodiment of the invention.

It is contemplated within the scope of the invention that many different configurations of a stylus-actuated blocking member may be implemented. For example, a blocking member may be spring-biased to transversely enter a stylus channel from a direction that is substantially perpendicular to a longitudinal axis of the channel so as to be positioned to at least partially obstruct an aperture for receiving a stop member. When the stylus is inserted into the stylus channel, the stylus may engage an angled portion of the blocking member so as to push the blocking member sideways and out of the stylus channel. When the blocking member is not positioned within the channel, the blocking member no longer obstructs the aperture. Furthermore, since the blocking member is spring-biased to move into the stylus channel, the blocking member will exert force on a side of the stylus, thereby helping to secure the stylus within the stylus channel. The above-described configuration is only one of many different configurations contemplated by the invention.

Figure 10:
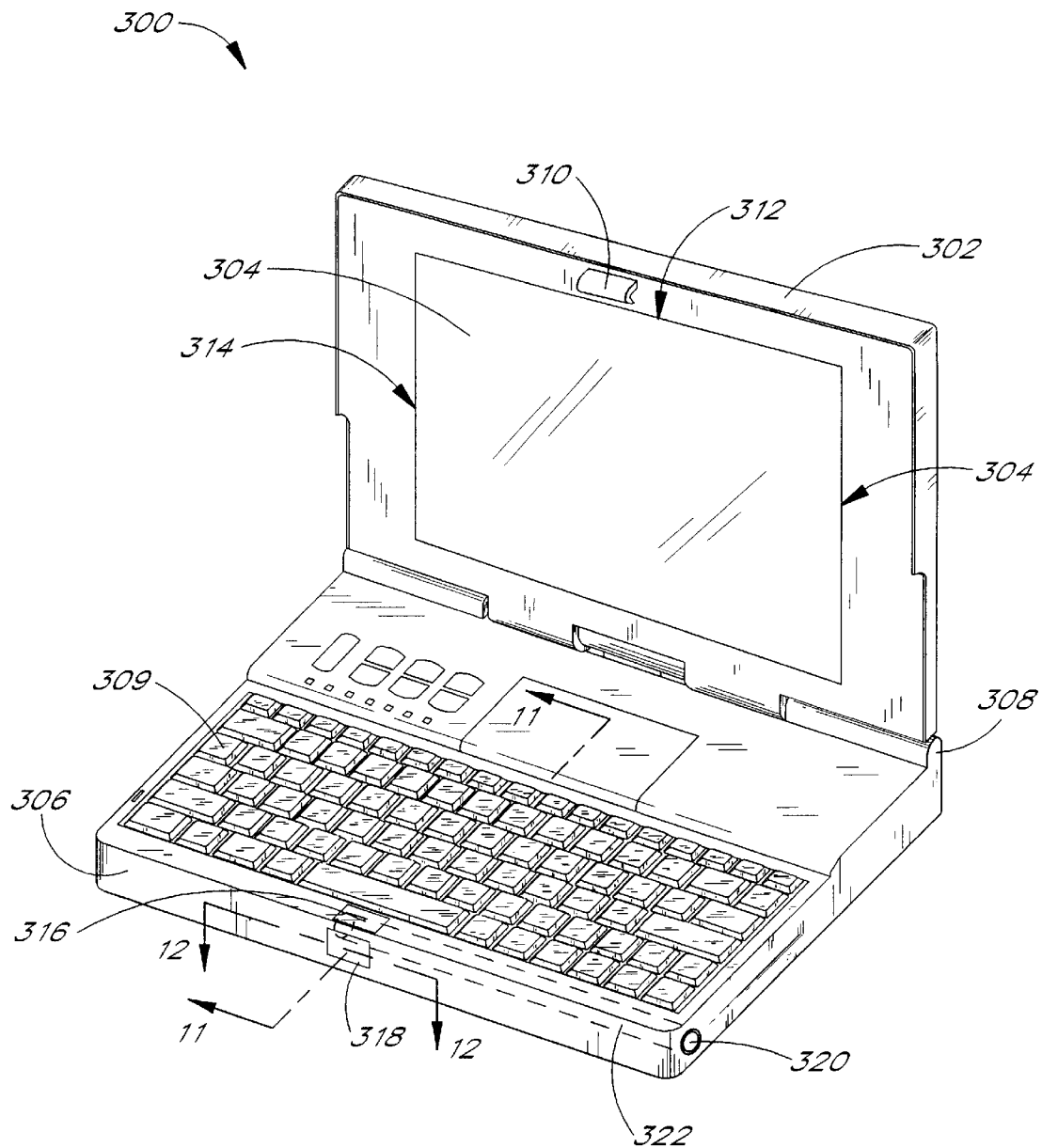
FIG. 10 is a perspective view of a computer having a stylus, a channel for receiving the stylus therein, and a touch-sensitive screen, in accordance with another embodiment of the invention.

Referring to FIG. 10, a perspective view of a computer 300, in accordance with another embodiment of the invention, is illustrated. The computer 300 includes a first member 302 which provides a display screen 304 for displaying text and other types of graphical information/images, and a second member 306 which is rotatably coupled to the first member 302 by a hinge 308. The second member 306 provides an alphanumeric keyboard 309 for receiving user inputs.

To latch the first member 302 shut with respect to the second member 306, the computer 300 includes a latch 310, attached to the first member 302 so as to extend outwardly from a front surface of the first member 302 on which the display screen 304 is provided. As shown in FIG. 10, the latch 310 is located adjacent to and above a top edge 312 of the display screen 304 at a substantially central position between the two side edges 314 of the display screen 304. When the first member 302 is in a closed position with respect to the second member 306, the latch 310 passes through a latch aperture 316, which is provided on the second member 306 at a position which is in mating alignment with the latch 310 when the first member 302 is in a closed position with respect to the second member 306. As described in further detail below with respect to FIG. 11, in this closed position, the latch 310 interlocks with the latch release 318 to secure the computer 300 in a closed position. As shown in FIG. 10, the computer 300 further includes a stylus 320 which is contained in a stylus channel 322 within the bottom housing portion 306 of the computer 300. As explained in further detail below with respect to FIGS. 11, 12A, and 12B, the presence of the stylus 320 within the stylus channel 322 spring-biases the latch release 318 to interlock with the latch 310 when the first member 302 is brought together with the second member 306 so as to place the computer 300 in a closed configuration.

Figure 11:
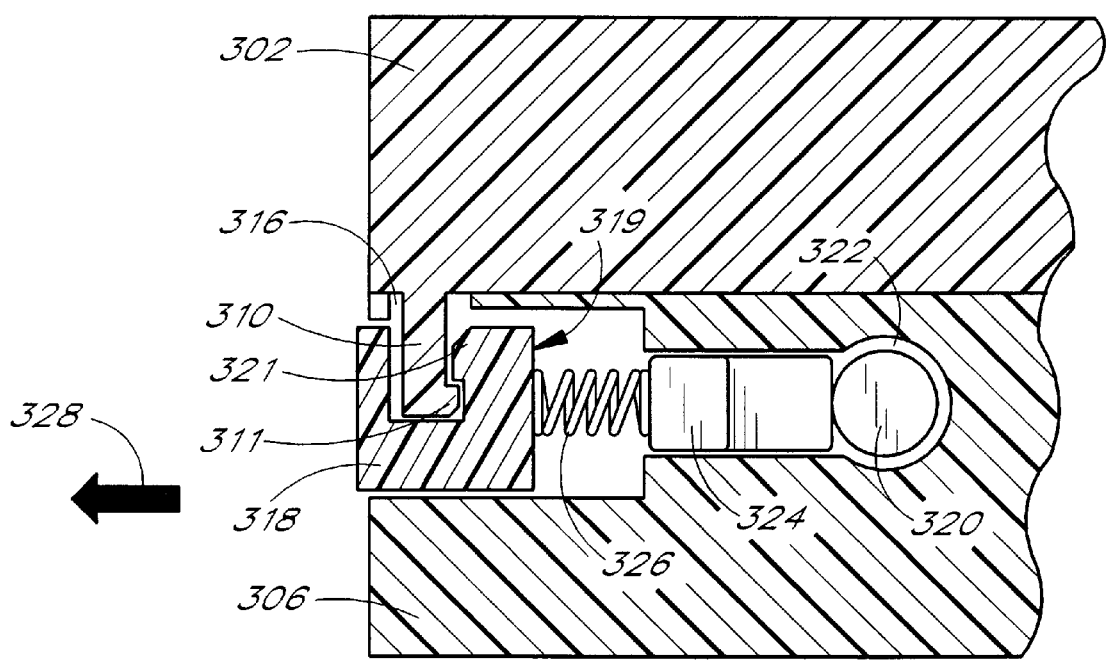
FIG. 11 is an elevational, cross-sectional view of the computer of FIG. 10, taken along line 11—11 of FIG. 10.

FIG. 11 illustrates an elevational cross-sectional, side view of the computer 300 of FIG. 10, taken along line 11—11 of that figure. When the stylus 320 is inserted into the stylus channel 322 within the second member 306 of the housing of the computer 300 (FIG. 10), the stylus 320 engages a biasing cam 324 which in turn engages a biasing spring 326 having one end coupled to a rear wall 319 of the latch release 318. As shown in further detail in FIGS. 12A and 12B, as the stylus 320 engages the biasing cam 324, the biasing cam 324 is caused to rotate counter-clockwise so as to engage a first end of the biasing spring 326. The biasing cam 324 causes the biasing spring 326 to exert an outward force toward and against the rear wall 319 of the latch release 318 in the direction indicated by arrow 328. Thus, the biasing spring 326 biases the latch release 318 outwardly in the direction of arrow 328 such that when the first member 302 is brought into a closed configuration with respect to the second member 306, the latch 310 enters through the latch aperture 316 and engages and interlocks with the latch release 318. As shown in FIG. 11, the biasing spring 326 presses the latch release 318 outwardly such that a hook portion 321 of the latch release 318 engages a hook portion 311 of the latch 310, and thus maintains the first member in the closed position adjacent the second member 306. As shown in FIG. 11, the biasing spring 326 ensures that the latch release 318 is pressed into the latch 310 once the latch 310 has passed through the latch aperture 316 and engages the latch release 318.

Figure 12A:
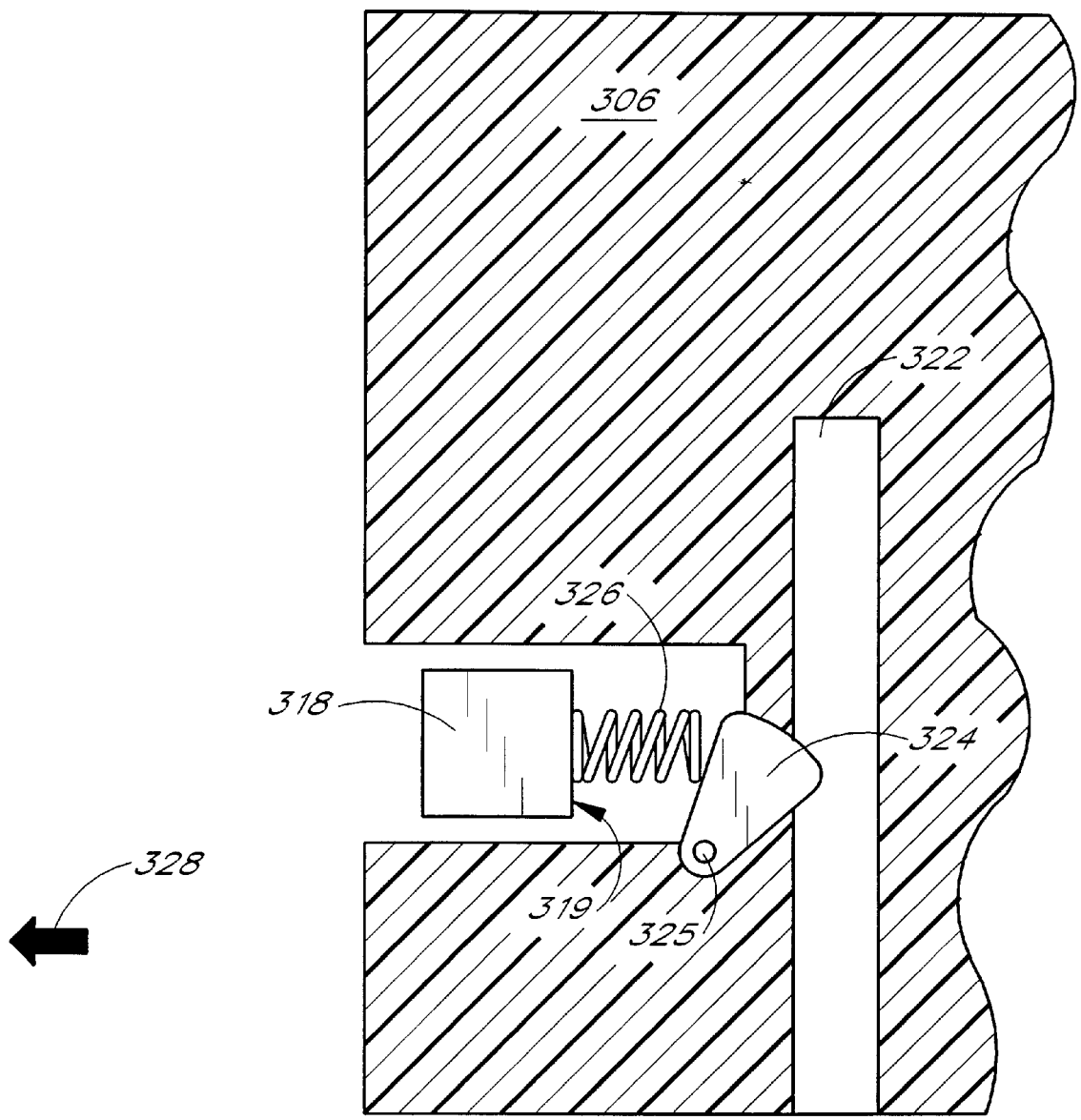
FIG. 12A is a top cross-sectional view of the computer of FIG. 10, taken along line 12—12 of that figure, when a stylus is not present within a stylus channel of the computer.

FIG. 12A illustrates a top cross-sectional view of a portion of the computer 300 of FIG. 10, taken along line 12—12 of that Figure. As shown in FIG. 12A, the stylus 320 (FIG. 11) is not present in the stylus channel 322. Thus, the biasing cam 324 is allowed to freely rotate clockwise about a pivot pin 325 such that the cam 324 may enter into the stylus channel 322. In one embodiment, the cam 324 may be spring-biased, or spring-loaded, to rotate about the pivot pin 325 in the clockwise direction such that the cam 324 enters into the stylus channel 322 when the stylus 320 is not present. Such spring-biasing may be provided by coupling a torsional spring (not shown) to the pivot pin 325 and the cam 324 such that when the torsional spring is in its unwound state, the cam 324 is rotated clockwise so as to be present in the stylus channel 320. However, in method and/or device for spring biasing which is or may be known to those of skill in the art may be utilized in accordance with the invention. When the biasing cam 324 is positioned within the stylus channel 322, the biasing cam 324 does not engage the biasing spring 326 so as to push the biasing spring 326 outwardly to engage a rear wall 319 of the latch release 318. Thus, when the stylus 320 (FIG. 11) is not positioned within the stylus channel 322, there is no biasing force which causes the latch release 318 to engage an interlock with the latch 310 (FIG. 11).

Figure 12B:
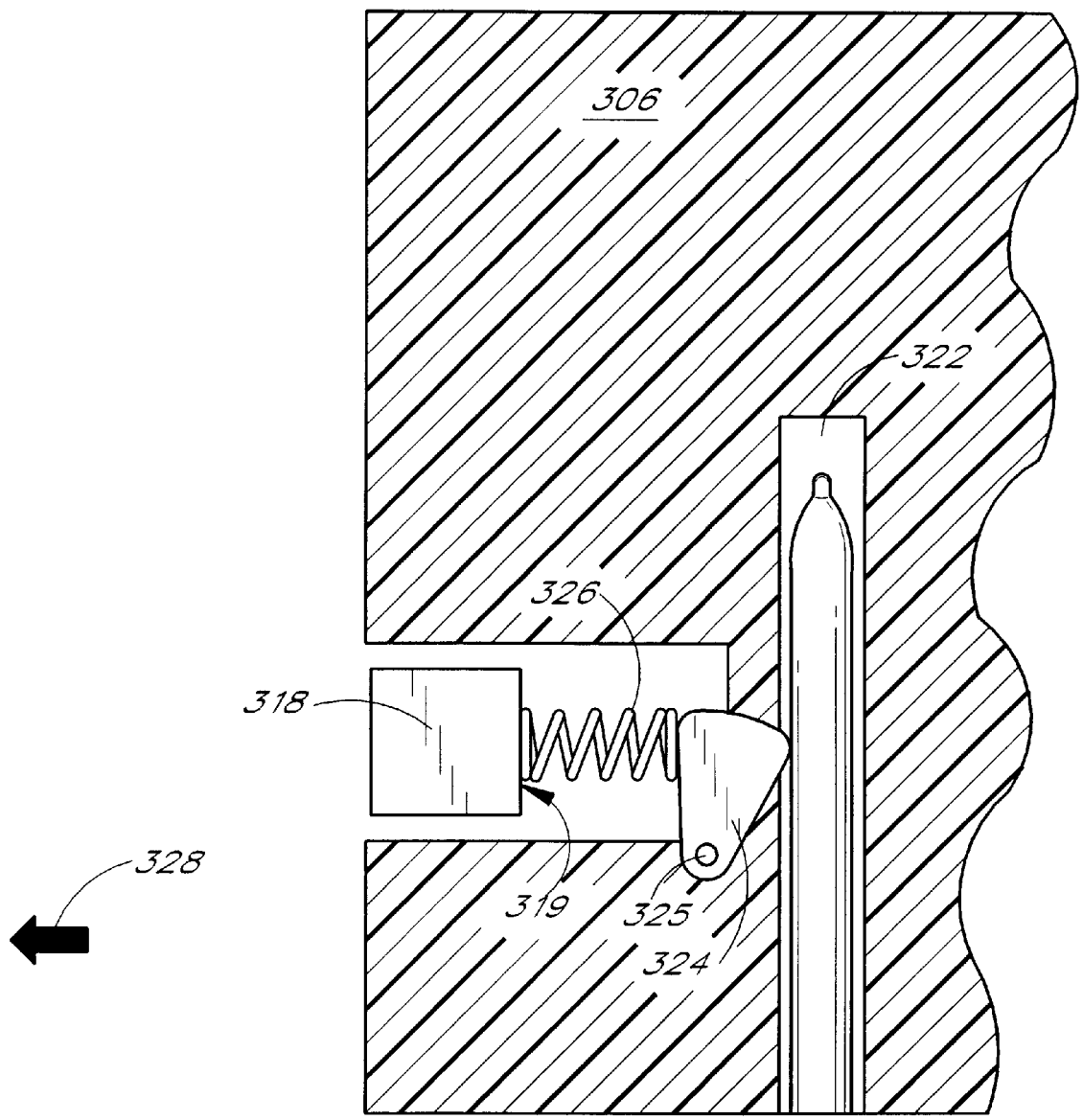
FIG. 12B is a top cross-sectional view of the computer of FIG. 10, taken along line 12—12 of that figure, when a stylus is positioned within a stylus channel of the computer.

FIG. 12B illustrates the same cross-sectional view of FIG. 12A, yet with a stylus 320 positioned within the stylus channel 322. When the stylus 320 is positioned within the stylus channel 322, the stylus 320 engages a portion of the biasing cam 324 such that the biasing cam 324 is caused to rotate counter-clockwise about the pivoting pin 325 to engage the biasing spring 326. When the biasing cam 324 rotates counter-clockwise to engage the biasing spring 326, the biasing spring 326 is caused to push the rear surface 319 of the latch release 318 so as to provide a compressional force against the latch release 318 in the direction of arrow 328. As described above with reference to FIG. 11, when the latch release 318 is pressed outwardly toward the direction of arrow 328, a hook portion 321 of the latch release 318 is caused to engage and interlock with a hook portion 311 (FIG. 11) of the latch 310 such that the hook portions 311 and 321 are pressed together, thereby interlocking the latch 310 (FIG. 11) with the latch release 318. As will be explained below, the user may always open the computer whether or not the stylus 320 is contained within the stylus channel 322. However, when the stylus 320 is not contained within the stylus channel 322, the first member 302 (FIG. 11) will not "lock" with the bottom member 306 with the desired compressional force provided by biasing spring 326. Thus, without the stylus 320 seated within the stylus channel 322, the housing of the computer 300 will not latch shut.

Referring again to FIG. 11, with the stylus 320 seated within the stylus channel 322, a user may still press the latch release 318 inwardly in a direction opposite to that indicated by arrow 328 so as to release the latch 310 from the latch release 318, thereby releasing the first member 302 of the housing from the second member 306 of the housing. In order to compress the latch release 318 inwardly, the user must overcome a nominal compressional force exerted by the biasing spring 326 which may be of any desired strength. When the stylus 320 is not present in the stylus channel 322 as shown in FIG. 12A, there is no compressional force exerted by the biasing spring 326 on the latch release 318. Thus, there is no force which causes the latch release 318 to engage and interlock with the latch 310 (FIG. 11) to ensure that the latch release 318 remains in contact with the latch 310. In other words, when the stylus 320 is not positioned within the stylus channel 322, the latch release 318 is allowed to freely move in a direction opposite the arrow 328 so as to freely disengage the latch 310.

As described above, when a stylus is not inserted into and positioned within a stylus channel, the housing of a computer will not latch or remain in the closed configuration properly. Therefore, a user who attempts to close the computer without the stylus properly seated in the stylus channel will discover that the stylus is missing from its holder. In this way, the user is reminded to replace the stylus into the stylus channel after each use of the stylus. It is contemplated that this reminder will impart upon the user the importance of properly placing the stylus back into the stylus channel after each use, thereby significantly reducing the possibility that the stylus will become lost due to inadvertent misplacement.

The invention may be embodied in other specific forms without departing from its spirit or essential characteristics. The described embodiments are to be considered in all respects only as illustrative and not restrictive. The scope of the invention is, therefore, indicated by the appended claims, rather than by the foregoing description. All changes which come within the meaning and range of equivalency of the claims are to be embraced within their scope.

What is claimed is:

1. A closure system, comprising:
   a computing device having a screen capable of receiving information from a user;
   a housing having a first member and a second member, wherein the first member is configured to matingly contact the second member to define a closed configuration;
   a stylus for inputting information to the device via said screen;
   a stylus receiver located in the second housing member, the stylus receiver receiving the stylus therein;
   a latch coupled to the first housing member; and
   a latch release coupled to the second housing member, the latch release engaging and interlocking with the latch when the first and second housing members are in the closed configuration and when the stylus is positioned within the stylus receiver.

2. The closure system of claim 1, wherein the device is a portable computer.

3. The closure system of claim 1 further comprising a latch aperture coupled to the second housing member, the latch aperture receiving therethrough the latch when the first housing member is in contact with the second housing member in the closed configuration.

4. The closure system of claim 1 further comprising:
   a biasing cam located within the second housing member and adjacent to the stylus receiver; and
   a biasing spring, coupled to the biasing cam and the latch release,
   wherein when the stylus is inserted into the stylus receiver, the stylus engages the biasing cam which presses the biasing spring toward the latch release such that the latch release is spring biased to engage and interlock with the latch when the first housing member and the second housing member are in the closed configuration.

5. The closure system of claim 1, further comprising a blocking member and blocking aperture, the blocking member disposed in the blocking aperture so as to obscure at least a portion of the blocking aperture when the stylus is removed from the stylus receiver.

6. The closure system of claim 5, wherein the blocking member prevents the first and second housing members from being placed in the closed configuration.

7. The closure system of claim 5, wherein the blocking member rotates around an axis in order to obscure the at least a portion of the aperture.

8. The closure system of claim 5, wherein the blocking member is slidably received within a channel disposed within the second housing member.

9. The closure system of claim 1, wherein the latch release is positioned so as to allow passage of at least a portion of the latch through the latch aperture when the stylus is inserted into the stylus receiver.

10. The closure system of claim 9, wherein the latch release is slidably received within a channel, the channel being disposed within the second housing member, and the latch release being positioned at least in part by a biasing spring and cam communicating with at least a portion of the stylus.

11. The closure system of claim 9, wherein the latch release is biased against the latch so as to maintain the first and second housing members in the closed configuration when the stylus is inserted into the stylus receiver.

12. A closure system comprising:
   an electronic device having a screen capable of receiving information from a user;
   a first housing member and a second housing member, the second housing member being coupled to the first housing member in a closed configuration;
   a stylus for inputting information to the electronic device via said screen;
   means for receiving the stylus in the second housing member; and
   means for latching the first and second housing members in the closed configuration when the stylus is positioned within the means for receiving the stylus.

13. The closure system of claim 12 wherein the means for latching comprises:
   a latch coupled to the first housing member;
   a latch aperture coupled to the second housing member, the latch aperture receiving therethrough the latch when the first housing member is in contact with the second housing member in the closed configuration; and
   a latch release coupled to the second housing member, the latch release engaging and interlocking with the latch when the first and second housing members are in the closed configuration and when the stylus is positioned within the means for receiving the stylus.

14. The closure system of claim 13 further comprising means for biasing the latch release to engage and interlock with the latch when the stylus is positioned within the means for receiving the stylus.

15. The closure system of claim 14 wherein the means for biasing comprises:
   a biasing cam located within the second housing member and adjacent to the means for receiving the stylus; and
   a biasing spring coupled to the biasing cam and the latch release wherein, when the stylus is inserted into the means for receiving the stylus, the stylus engages the biasing cam which presses the biasing spring toward the latch release such that the latch release is spring biased to engage and interlock with the latch when the first housing member and the second housing member are in the closed configuration.

* * * * *

UNITED STATES PATENT AND TRADEMARK OFFICE
CERTIFICATE OF CORRECTION

PATENT NO.   : 6,068,307                                               Page 1 of 1
DATED        : May 30, 2000
INVENTOR(S)  : S.C. Murphy It is certified that error appears in the above-identified patent and that said Letters Patent is hereby corrected as shown below:

<u>Column 1,</u>
Line 9, should read:

16, 1998, and is related to commonly-owned U.S. application Serial No. 09/098,125, filed June 16, 1998, entitled CLOSURE METHOD FOR DEVICES HAVING A STYLUS, and U.S. application Serial No. 09/100,376, filed June 19, 1998, entitled SYSTEM AND METHOD FOR INDICATING WHEN A STYLUS OF A COMPUTER IS MISSING.

Signed and Sealed this

Twenty-fifth Day of September, 2001

*Attest:*

*Attesting Officer*

NICHOLAS P. GODICI
*Acting Director of the United States Patent and Trademark Office*